US005398394A

United States Patent [19]

Hyatt et al.

[11] Patent Number: 5,398,394

[45] Date of Patent: Mar. 21, 1995

[54] SWAGING TOOL FOR AXIALLY SWAGED FITTINGS

[75] Inventors: Arthur J. Hyatt, Torrance; Biing-Kwang K. Hsieh, Garden Grove; Earl T. Wootton, Paramount, all of Calif.

[73] Assignee: The Deutsch Company, Santa Monica, Calif.

[21] Appl. No.: 122,744

[22] Filed: Sep. 15, 1993

Related U.S. Application Data

[63] Continuation of Ser. No. 828,512, Jan. 31, 1992, abandoned.

[51] Int. Cl.[6] .............................................. B23P 19/04

[52] U.S. Cl. ....................................................... 29/237

[58] Field of Search ...................... 29/237, 282, 283.5, 29/252, 520; 72/453.02

[56] References Cited

U.S. PATENT DOCUMENTS

| | | |
|---|---|---|
| 539,573 | 5/1895 | Cartwright . |
| 1,085,461 | 1/1914 | Michaselis . |
| 1,350,904 | 8/1920 | Walters . |
| 2,328,747 | 9/1943 | Schweidler . |
| 3,143,790 | 8/1964 | Over et al. . |
| 3,280,864 | 10/1966 | Spanenberg . |
| 3,299,496 | 1/1967 | Christensen . |
| 3,474,519 | 10/1969 | Hallesy . |
| 3,579,794 | 5/1971 | Powell . |
| 3,585,704 | 6/1971 | Schroeder . |
| 3,599,310 | 8/1971 | Brownlee . |
| 3,726,122 | 4/1973 | Dawson . |
| 3,727,289 | 4/1973 | Bemelmann et al. . |
| 3,777,354 | 12/1973 | Masters . |
| 4,170,125 | 10/1979 | Minka . |
| 4,189,817 | 2/1980 | Moebius . |
| 4,257,135 | 3/1981 | Moebius . |
| 4,345,361 | 8/1982 | Baumann . |
| 4,483,056 | 11/1984 | Schwalm et al. . |
| 4,559,691 | 12/1985 | Mannhart et al. . |
| 4,809,418 | 3/1989 | Burli . |

FOREIGN PATENT DOCUMENTS

| | | |
|---|---|---|
| 2032444 | 1/1972 | Germany . |
| 28769 | 1/1933 | Netherlands . |

OTHER PUBLICATIONS

Bulletin 1674 entitled "Rynglok Fitting System" by Aeroquip Linair Division, year 1987, total 8 pages.

Advertisement entitled "The Lokring Pipe And Tube Joining System" produced by Lokring Corporation, total 2 pages.

*Primary Examiner*—Robert C. Watson

*Attorney, Agent, or Firm*—Pretty, Schroeder, Brueggemann & Clark

[57] ABSTRACT

A swaging tool for swaging an axially swaged fitting for connecting tubes and pipes is disclosed. The tool comprises a housing and a piston movable in opposite axial directions within the housing. A first engaging member in the form of a U-shaped yoke is formed on the outer surface of the housing. A second engaging member, also in the form of a U-shaped yoke, is formed on the outer surface of the piston and is adapted to slide within slots in the outer surface of the housing. Both of these yokes are configured to allow each yoke to engage a portion of the fitting to swage it when the yoke of the second engaging member is moved toward the yoke of the first engaging member.

21 Claims, 2 Drawing Sheets

SWAGING TOOL FOR AXIALLY SWAGED FITTINGS

This application is a continuation of application Ser. No. 07/828,512, filed Jan. 31, 1992, now abandoned.

BACKGROUND OF THE INVENTION

The present invention relates to swaging tools for use in swaging fittings and, more particularly, to a swaging tool for swaging axially swaged fittings.

Swaged fittings have been used for many years to connect tubes and pipes in various types of fluid systems, including those used in the aircraft, marine, petroleum and chemical industries. The tube ends are inserted into a fitting, usually in the form of a cylindrical sleeve, and then the fitting is swaged with a swaging tool to produce a fluid-tight connection between the tubes. This swaging operation usually is carried out by applying a radial force which radially compresses the fitting and tubing inwardly. This radial force may be applied directly by the swaging tool or indirectly by a specially shaped ring which is moved axially by the swaging tool to apply a radial force to the fitting. The invention of the present application is directed to the latter type of swaging tool designed for use with fittings having axially movable swaging rings. These fittings shall be referred to as axially swaged fittings.

Typical axially swaged fittings comprise a cylindrical sleeve having openings at opposite ends for receiving the ends of two tubes, with a swaging ring at each end of the sleeve. The outer surface of the sleeve and the inner surface of the swaging ring which contact each other are shaped such that axial movement of the swaging ring over the sleeve applies a radial force to the sleeve and, thus, to the tubes. Although not all fittings employ a sleeve with two swaging rings, the use of two swaging rings is necessary when it is desired, as is often the case, to join two tubes to each other.

In situations where it is necessary to swage a fitting having two swaging rings, the tool operator must first swage one side of the fitting to one of the tubes by axially moving the corresponding swaging ring over the corresponding end of the sleeve. After this, the operator must usually rotate the orientation of the tool by 180 degrees and repeat the above procedure to swage the other side of the fitting to the other tube.

Difficulties have existed in the past when swaging axially swaged fittings with existing swaging tools. For example, the need to rotate the orientation of the tool to swage both sides of the fitting increases the time required to perform the swaging operation. This increase in time translates into increased labor costs which can be significant when swaging large numbers of fittings, as is common in aircraft applications. It also tends to result in increased operator fatigue, since existing commercially available swaging tools tend to be large and bulky. Furthermore, the need to rotate the tool increases the effective tool envelope and can make a swaging operation difficult or impossible to perform in a confined area, such as near a bulkhead or the like.

Still another drawback with existing swaging tools is their excessive weight, their rather large size and relative complexity involving a large number of moving parts. This undesirably adds to the manufacture and maintenance costs, as well as leading to increased operator fatigue when handling the tool for extended time periods. Also, because of the tool's excess size and weight, the operator must usually take special care to properly position and hold the tool over the fitting to prevent cocking of the swaging ring during the swaging operation.

Accordingly, there has existed a definite need for a swaging tool for swaging axially swaged fittings which has few moving parts, is lighter in weight and more reliable than prior swaging tools. There has further existed a definite need for a swaging tool that can swage both sides of the fitting without rotating the tool and that can be used to swage fittings in confined areas. The present invention satisfies these and other needs and provides further related advantages.

SUMMARY OF THE INVENTION

The present invention provides a swaging tool for use in swaging axially swaged hydraulic fittings and the like to join two or more tubes together. The three-piece design of the tool, in combination with other features described below, contributes to a balanced swaging tool that is extremely compact and lightweight, thus enabling the effective swaging of fittings in confined and otherwise inaccessible areas. The swaging tool of the present invention furthermore is intended to be simple to operate, reliable in use, relatively inexpensive to manufacture and low in maintenance.

The swaging tool is designed for use with axially swaged fittings of the type having a sleeve for receiving a tube and a swaging ring. When the ring is moved axially over the sleeve, it applies a radial force to the sleeve which swages the sleeve to the tube. The swaging tool may be used with fittings employing a sleeve with two swaging rings, a sleeve with a single swaging ring, or other appropriate configurations and combinations to join the fitting to one or more tubes.

The swaging tool comprises a housing having an inner surface and an outer surface, and a piston that is movable in opposite axial directions within the housing. In the preferred embodiment, the housing is cylindrical in shape, and the piston has a cylindrical outer surface in axial sliding engagement with the inner surface of the housing. The housing preferably has a closed end and an open end which is connected by threads to a cap, which encloses the piston within the housing. This cap is connected to a source of hydraulic pressure for selectively moving the piston axially within the housing from the open end to the closed end of the housing. A spring or other appropriate biasing means is interposed between the closed end of the housing and the piston to normally bias the piston toward the open end of the housing.

In accordance with the invention, a first engaging member is formed on the outer surface of the housing adjacent to the closed end for engaging the ring or the sleeve to restrain it from axial movement. A second engaging member is formed on the outer surface of the piston for engaging the ring or the sleeve to move it in an axial direction toward the first engaging member upon movement of the piston toward the closed end of the housing. The first engaging member and the second engaging member are adapted to engage either the ring or the sleeve. Thus, the operator may first swage one side of the fitting by, for example, engaging the sleeve with the first engaging member, which is stationary, and engaging the swaging ring with the second engaging member, which moves the ring over the sleeve. After this, the operator does not need to rotate the tool by 180 degrees to swage the other end of the fitting.

Instead, the operator need only position the first engaging member in contact with the swaging ring and the second engaging member in contact with the sleeve. Swaging of the ring over the sleeve in this manner is enabled, without rotating the orientation of the tool by 180 degrees, since the first and second engaging members advantageously may engage the ring or the sleeve.

In one aspect of the invention, the first and second engaging members each comprise a yoke having a U-shape, comprising two vertical side portions joined by a semi-circular base. The yoke of the first engaging member is connected directly to the outer surface of the housing and includes two spaced apart stabilizing legs connected to the outer surface of the housing and to the two vertical side portions of the U-shaped yoke. The yoke of the second engaging member, however, is radially spaced from the outer surface of the piston and is connected to it by a pair of spaced apart legs connected to and extending outwardly from the outer surface of the piston. These legs are designed to move within corresponding spaced apart axial slots in the housing. The portion of the housing between these two slots slides between the outer surface of the piston and the semi-circular base of the yoke corresponding to the second engaging member. This configuration advantageously provides a three-piece design i.e., the housing, piston and cap, plus auxiliary components consisting of a spring, a seal, two bearings and a support ring, which fit together and cooperate to provide an extremely compact and lightweight swaging tool.

The unique design of the tool and the use of axial slots in the tool housing advantageously allows a minimum displacement of the force generating axis (i.e., along the piston axis) from the force application axis (i.e., along the fitting axis). As a result, the internal tool deflection and stresses are reduced. This translates to and enables a reduction in the tool's size and weight.

The vertical side portions of each yoke contacting the fitting, which are nominally parallel, are actually canted slightly, if necessary, such that the internal deflection of the tool when subject to swaging forces will cause the yoke side portions to come into nearly exact parallelism when the tool is at maximum swaging force. This reduces, and in some cases eliminates, cocking of the swaging ring when the swaging operation is performed. A balanced configuration to the tool also is provided by aligning the yokes along a common axis such that the forces generated during the swaging operation are also concentrated along this axis. This axis is aligned with the axis of the fitting and with the focal point of the semi-circular base of each yoke. It is also parallel to the axis of the cylindrical housing. This configuration deletes any external moment or force to the tool, which is hand-held by the operator. Eliminating this outside force provides easier manipulation and movement of the tool by the operator.

Other features and advantages of the present invention will become apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
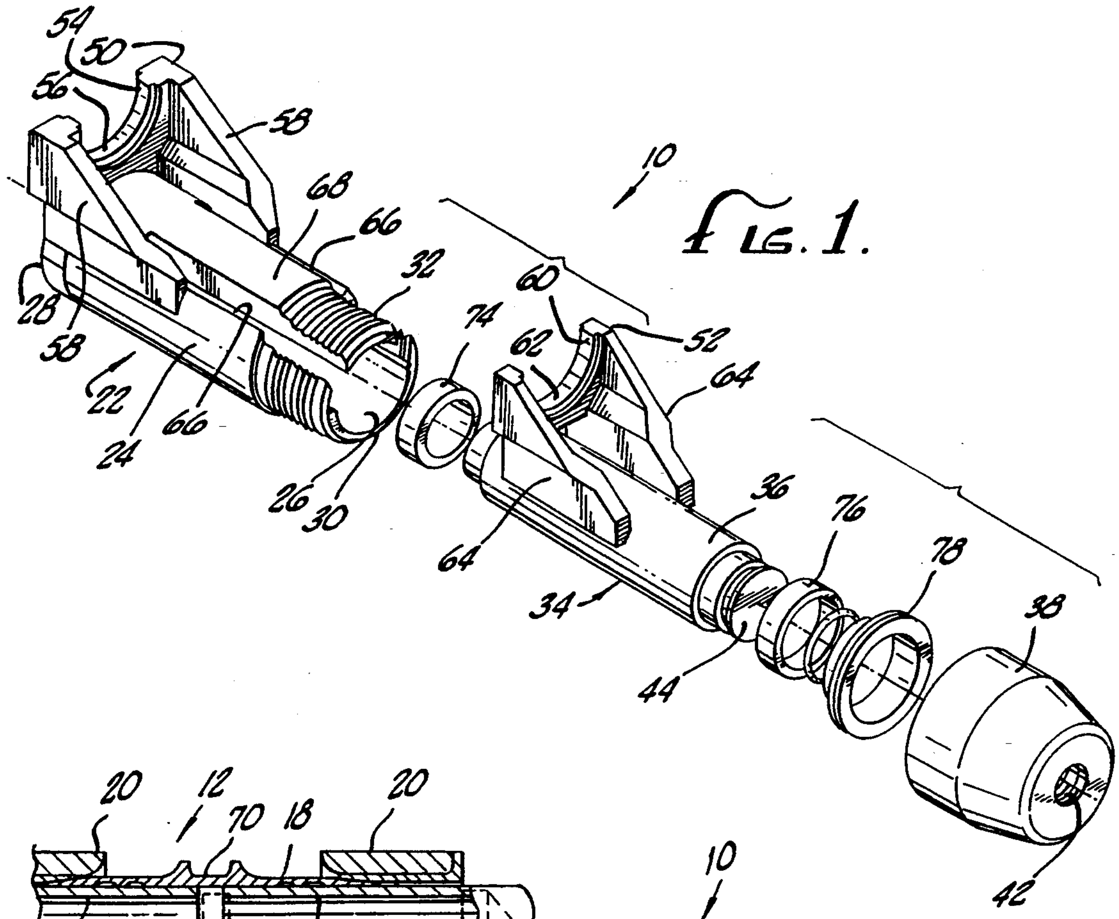
FIG. 1 is an exploded assembly view in perspective of a swaging tool embodying the features of the present invention.

As shown in the accompanying drawings, the present invention is embodied in a swaging tool, indicated generally by the reference numeral 10, for use in swaging a fitting 12 and joining two tubes 14 and 16 together. The tool is especially adapted for swaging fittings of the type having a cylindrical sleeve 18 with a tapered outer surface and a cylindrical inner surface for receiving the tube 14 or 16. A swaging ring 20 surrounds the sleeve 18 and has an inner surface which matches and engages with an outer surface of the sleeve 18. Before swaging, the swaging ring 20 is positioned outwardly with respect to the sleeve 18 such that no radial force is applied by the swaging ring to the sleeve. During swaging, the swaging ring 20 is moved axially in a forward direction over the sleeve 18 such that the interaction of the tapered surfaces on the ring and the sleeve applies a radial force deforming the sleeve 18 and tube 14 or 16 inwardly to make a swaged connection between them. These fittings shall be referred to generally as axially swaged fittings. It will be appreciated, however, that other configurations of the contacting surfaces between the fitting 18 and the ring 20 are possible, since the operation of the tool 10 is independent of these configurations.

FIG. 1 shows an exploded assembly view of the tool 10. The tool 10 comprises a housing 22 having a substantially cylindrical outer surface 24 and a cylindrical inner surface 26. The housing 22 has a closed end 28 and an open end 30, with external threads 32 on the outer surface 24 of the housing's open end. A piston 34 having a cylindrical outer surface 36 is movable in opposite axial directions within the housing 22 in sliding engagement with the housing's cylindrical inner surface 26. A cap 38 having an internally threaded surface 40 is threadably connected to the threads 32 on the outer surface 24 of the housing 22. This encloses the piston 34 within the housing 22.

The cap 38 also includes a port 42 for connection to a source of hydraulic pressure such that, when pressure is introduced through the port 42, it acts against a head 44 on the piston 34, moving the piston toward the closed end 28 of the housing 22. The end of the piston 34 opposite the head 44 has a receptacle 46 which holds one end of a spring 48 whose other end contacts the closed end 28 of the housing 22. Thus, in the absence of sufficient pressure to overcome the force of the spring 48, the spring normally biases the piston 34 away from the closed end 28 of the housing 22.

In accordance with the invention, two engaging members are provided on the housing 22 and the piston 34 for moving the swaging ring 20 over the sleeve 18 to thereby swage the fitting 12 to the tube 14 or 16. In one preferred embodiment, these engaging members comprise an outer yoke 50 formed on the outer surface 24 of the housing 22 and an inner yoke 52 formed on the outer surface 36 of the piston 34. As discussed in more detail below, each of these yokes 50 and 52 is adapted to engage the ring 20 or the sleeve 18, to cause axial movement of the swaging ring over the sleeve to swage the fitting 12.

Figure 2:
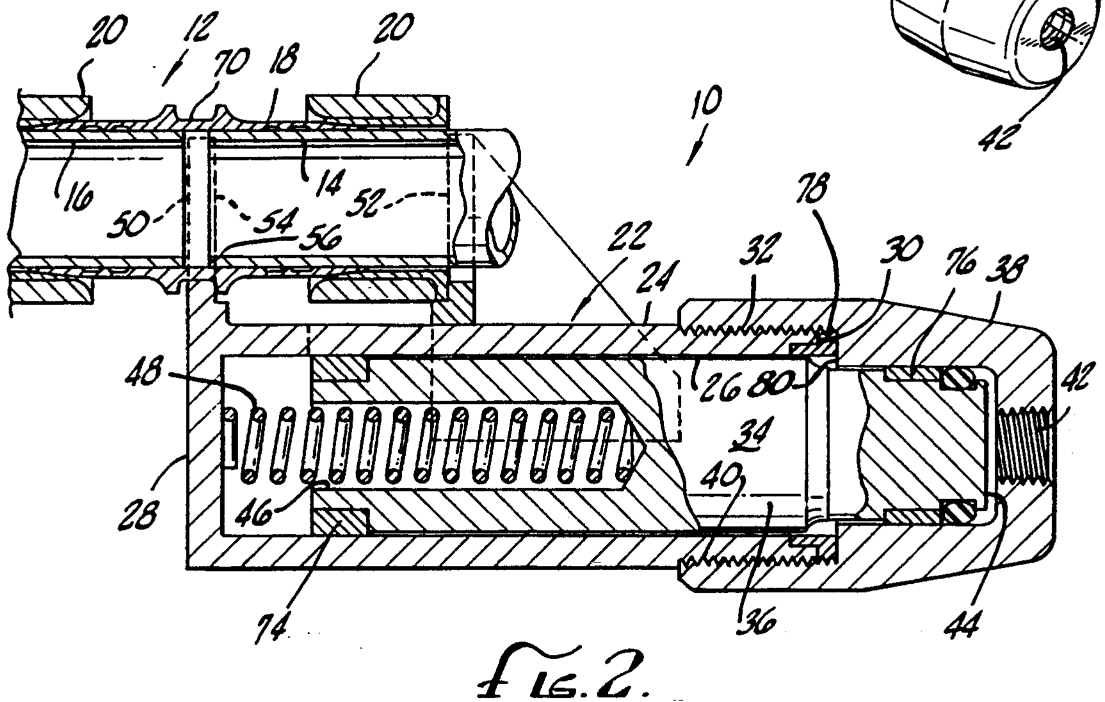
FIG. 2 is a cross-sectional, elevational view of the swaging tool, showing the tool in position prior to swaging a fitting.
Figure 3:
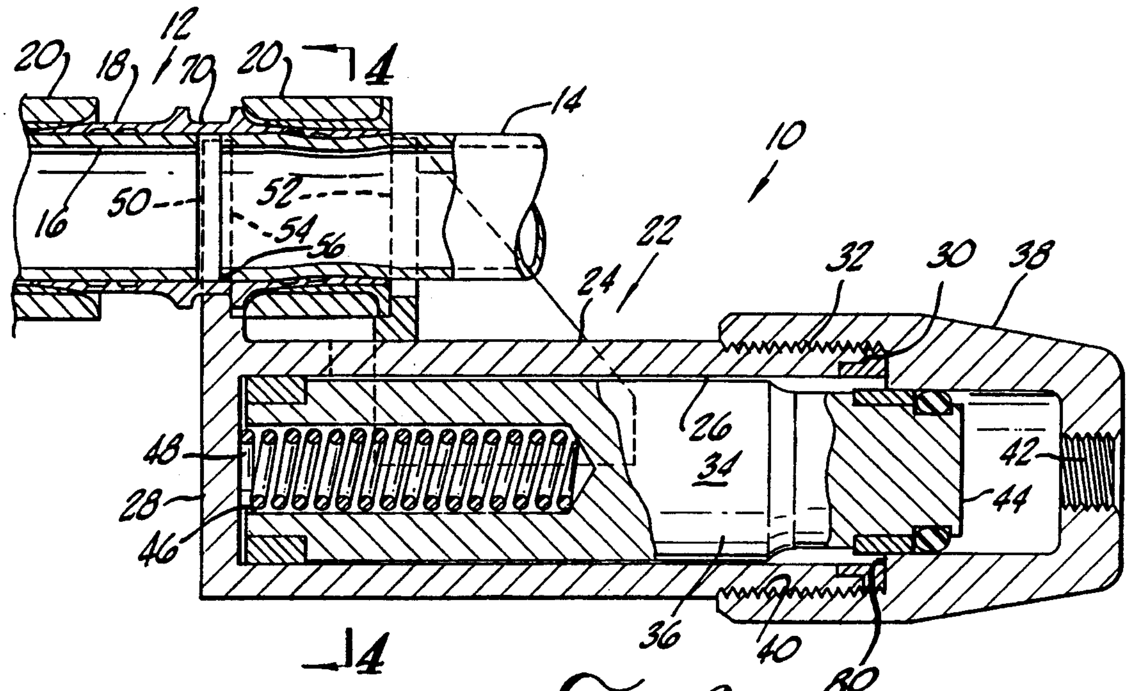
FIG. 3 is a cross-sectional, elevational view, similar to FIG. 2, showing the swaging tool after the fitting has been swaged.
Figure 4:
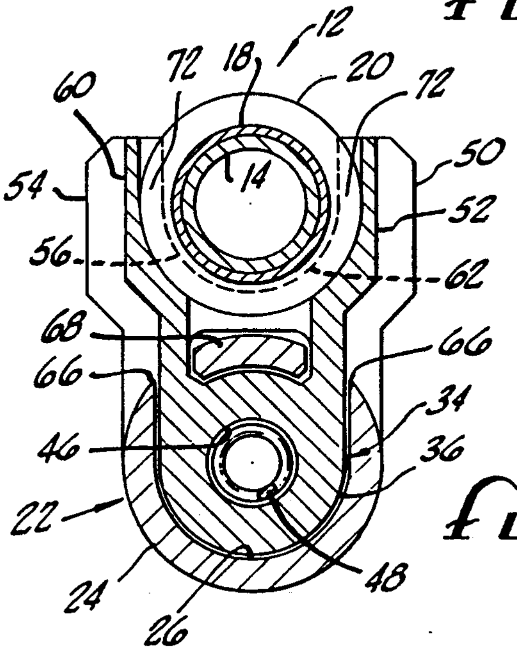
FIG. 4 is a cross-sectional, elevational view of the swaging tool, taken substantially along line 4—4 of FIG. 3, showing a raised bearing area on a yoke of the tool adapted to engage the fitting.

FIGS. 2–3 show the positions of the yokes 50 and 52 before and after the swaging operation. As shown in these figures, and in FIGS. 1 and 4, the outer yoke 50 is formed on the outer surface 24 of the housing 22 adjacent to the closed end 28 for engaging the ring 20 or the sleeve 18 to restrain it from axial movement. The outer yoke 50 has a substantially U-shape, comprising two vertical side portions 54 joined at the bottom by a semi-circular base 56. In order to support the outer yoke 50 and to prevent its breakage during the swaging operation in which extremely high forces are generated, two spaced apart stabilizing legs 58 are connected to the two vertical side portions 54 of the yoke 50 and to the outer surface 24 of the housing 22.

The inner yoke 52 is identical in construction to the outer yoke 50 and comprises two vertical side portions 60 joined at the bottom by a semi-circular base 62. The inner yoke 52 also is connected to the outer surface 36 of the piston 34 by two spaced apart stabilizing legs 64. These legs 64 are connected to the two vertical side portions 60 of the U-shaped inner yoke 52 and to the outer surface 36 of the piston 34. The inner yoke 52, however, does not have its semi-circular base 62 connected directly to the outer surface 36 of the piston 34 like the outer yoke 50. Instead, the semi-circular base 62 of the inner yoke 52 is spaced from the outer surface 36 of the piston 34 and is, therefore, supported solely by the two stabilizing legs 64.

In order to permit sliding axial movement of the piston 34 with respect to the housing 22, two spaced apart axial slots 66 are formed in the housing 22 between its two stabilizing legs 58, which support the outer yoke 50. The stabilizing legs 64 of the inner yoke 52 are designed to slide within these axial slots 66 in the housing 22. The portion 68 of the housing 22 between these two slots 66 therefore slides between the outer surface 36 of the piston 34 and the semi-circular base 62 of the inner yoke 52 when the piston 34 moves with respect to the housing 22.

It is noted that the axial slots 66 extend completely through the threads 32 of the housing 22. Ordinarily, it would be very unusual and against conventional practice to interrupt the threads of a swaging tool in this manner, because it would tend to weaken and compromise the integrity of the threaded connection between, in this case, the housing 22 and the cap 38. However, the structural integrity of the tool is not harmed by the axial slots 66, because the threads 32 of the housing 22 have a tapered configuration which distributes the load substantially equally on each thread, rather than on just the first two threads, as is common. More particularly, the threads 32 on the housing are tapered such that the outer pitch diameter of the threads increases in a direction away from the open end 30 of the housing 22. The threads 40 on the cap are made with a constant pitch diameter. This provides a strong threaded connection between the housing 22 and the cap 38 which is not affected by the axial slots 66.

In addition, a cylindrical support ring 78 is placed over the open end 30 of the housing 22. This support ring 78 supports the portion 68 of the housing 22 between the two axial slots 66 and prevents the portion 68 from deflecting radially inward when the cap 38 is pressurized thereby causing the threads to be subjected to a high tensile force. The support ring 78 in the preferred embodiment has an L-shaped cross-section which fits within a recess in the open end 30 of the housing 22. When the cap 38 is screwed onto the housing, a shoulder 80 on the cap engages the support ring 78 to secure it in place.

As noted above, the outer yoke 50 and the inner yoke 52 are each adapted to engage either the ring 20 or the sleeve 18. This advantage is provided by making the portions of the yoke which engage the sleeve 18 or the ring 20 identical to each other. As explained below, the advantage provided by this configuration is significant.

As shown best in FIGS. 2–3, the operator may first swage one side of the fitting 12 by, for example, engaging a groove 70 on the sleeve 18 with the outer yoke 50, which is stationary, to restrain the sleeve 18 from movement during swaging. The inner yoke 52 is then positioned in engagement with the outer end of the swaging ring 20. When pressure is supplied through the port 42, the piston 34 is moved toward the closed end 28 of the housing 22, compressing the spring 48 and moving the inner yoke 52 toward the outer yoke 50. This moves the swaging ring 20 over the sleeve 18 and swages the sleeve to the tube 14. At the end of the swaging operation, the pressure source is relieved and the spring 48 returns the piston 34 toward the open end 30 of the housing and thereby separates the inner yoke 52 from the outer yoke 50. This returns the tool 10 to the ready position for the next swaging operation.

After this, the operator does not need to rotate the tool 10 by 180 degrees to swage the other end of the fitting 12. Instead, the operator need only position the inner yoke 52 in contact with the groove 70 of the sleeve 18 and the outer yoke 50 in contact with the outer end of the swaging ring 20. Pressure is again introduced through the port 42, causing the inner yoke 52 to move toward the outer yoke 50 in the manner described above. This, in turn, causes the swaging ring 20 to slide over the sleeve 18 and to swage the sleeve to the tube 16. Swaging of the ring 20 over the sleeve 18 in this second swaging operation is enabled, without rotating the orientation of the tool 10 by 180 degrees, since the inner and outer yokes 50 and 52 advantageously may engage the ring 20 or the sleeve 18. This advantageously allows swaging of fittings in confined areas, such as near bulkheads and the like.

The vertical side portions 54 and 60 of the inner and outer yokes 50 and 52 have a canted surface which contacts the ring 20 or the sleeve 18. In the preferred embodiment this surface is canted inwardly about 0–3 degrees with respect to a normal vertical surface. This canted surface is added to the yokes 50 and 52 so that the deflection in the tool resulting from the swaging forces, when applied, brings the surfaces into parallelism when maximum swaging forces are achieved. This helps reduce, and in some cases eliminates, undesirable cocking of the swaging ring 20 when the swaging ring is being moved over the sleeve 18 during the swaging operation. To further help reduce this cocking, which results partially from non-axial movement (i.e., radial movement) of the piston 34 within the housing 22, and to permit smooth movement of the outer surface 36 of the piston 34 with respect to the inner surface 26 of the housing 22, a pair of bearings 74 and 76 are provided between these two engagement surfaces 26 and 36. These bearings 74 and 76 are preferably cylindrical and self-lubricating.

Another advantage of the swaging tool 10 is its balanced configuration. This balanced configuration is provided by aligning the inner and outer yokes 50 and 52 along a common axis such that the forces generated during the swaging operation are also concentrated along this axis. This axis is the same as the axis of the fitting 12 and corresponds to the focal point of the semi-circular base 56 and 62 of each yoke 50 and 52. This axis also is parallel to the axis of the housing 22. To achieve this balanced configuration, the yokes 50 and 52 are identical in structure and their semi-circular bases 56 and 62 are spaced substantially the same distance from the outer surface 24 of the housing 22. This structure advantageously deletes any external moment or force to the tool 10, which is hand held by the operator. Eliminating this external moment or force therefore provides easier manipulation and movement of the tool 10 by the operator.

Most of the components of the tool 10 are manufactured from bar stock and may be machined into their various shapes by an electrical discharge machine. Preferred materials for the housing 22 include stainless steel, such as PH 13-8 MO stainless steel. Preferred materials for the piston 34, cap 38 and support ring 78 include stainless steel, such as PH 17-4 MO stainless steel. The self-lubricating bearings preferably are made from oil impregnated high strength powdered metal to reduce the need to constantly relubricate the tool.

From the foregoing, it will be appreciated that the swaging tool 10 of the present invention, which consists of only three major components, provides a swaging tool 10 of greatly reduced size and weight. This results in a more simplified swaging operation and the ability to perform swaging operations that would normally be difficult or impossible to perform in a confined area, such as a bulkhead or the like. The small and lightweight nature of the tool 10 helps reduce operator fatigue, increases productivity and reduces labor and maintenance expenses. These and other advantages give the swaging tool 10 of the present invention a definite advantage in today's aircraft and aerospace designs, as well as those in the marine, petroleum and chemical industries.

While a particular form of the invention has been illustrated and described, it will be apparent that various modifications can be made without departing from the spirit and scope of the invention. Accordingly, it is not intended that the invention be limited, except as by the appended claims.

I claim:

1. A swaging tool for swaging a fitting having a sleeve for receiving a tube, and a swaging ring such that axial movement of the ring over the sleeve causes the ring to apply a radial force to the sleeve to thereby swage the sleeve to the tube, the swaging tool comprising:

(a) a housing having an inner surface and an outer surface;

(b) a piston movable in opposite axial directions within the housing, said piston having an outer surface in axial sliding engagement with the inner surface of the housing which reacts the moments generated during swaging directly into the housing;

(c) a first engaging member on the outer surface of the housing that accepts both of the ring and the sleeve and restrains one of them from axial movement; and (d) a second engaging member connected to the piston that accepts both of the ring and the sleeve, and moves the other of them in an axial direction toward the first engaging member upon movement of the piston within the housing in said axial direction.

2. The swaging tool of claim 1, wherein the second engaging member comprises:

(a) a leg connected to and extending outwardly from the outer surface of the piston; and (b) a yoke connected to the leg that accepts both of the ring and the sleeve.

3. The swaging tool of claim 2, wherein the housing has an axial slot through which the leg moves upon movement of the piston within the housing in said opposite axial directions.

4. The swaging tool of claim 1, wherein the second engaging member comprises:

(a) a pair of spaced apart legs connected to and extending outwardly from the outer surface of the piston; and (b) a yoke connected to said legs that accepts both of the ring and the sleeve.

5. The swaging tool of claim 4, wherein the housing has a pair of spaced apart axial slots through which said legs move upon movement of the piston within the housing in said opposite axial directions.

6. The swaging tool of claim 5, further comprising a cap connected to the housing which encloses the piston within the housing.

7. The swaging tool of claim 6, wherein load sharing tapered external threads on the housing engage internal threads on the cap to connect the cap to the housing, and wherein the pair of spaced apart axial slots extend through the external threads on the housing.

8. The swaging tool of claim 7, further comprising a support ring on the housing to support the housing in the area where the external threads on the housing engage the internal threads on the cap.

9. The swaging tool of claim 1, wherein the first and second engaging members each have a canted surface that inhibits cocking of the ring during the swaging operation.

10. The swaging tool of claim 9, wherein the first and second engaging members each comprise a yoke having a U-shape, comprising two vertical side portions joined by a semi-circular base, and wherein said canted surface is provided on each of said vertical side portions.

11. A swaging tool for swaging a fitting having a cylindrical sleeve for receiving a tube at each end of the sleeve, and a swaging ring at each end of the sleeve such that axial movement of the rings over the sleeve causes the rings to apply radial forces to the sleeve to thereby swage the sleeve to the tubes, the swaging tool comprising:

(a) a housing having an inner surface and an outer surface;

(b) a piston movable in opposite axial directions within the housing, said piston having an outer surface in axial sliding engagement with the inner surface of the housing which reacts the moments generated during swaging directly into the housing;

(c) a first engaging member on the outer surface of the housing that accepts both of the sleeve and one of the rings and restrains one of them from axial movement; and (d) a second engaging member comprising a leg connected to and extending outwardly from the outer surface of the piston and a yoke connected to the leg that accepts both of the sleeve and one of the rings, and moves the other of them in an axial direction toward the first engaging member upon movement of the piston within the housing in said axial direction, such that both rings can be moved axially over the sleeve to swage the fitting without rotating the tool by 180 degrees.

12. The swaging tool of claim 11, wherein the housing has an axial slot through which the leg moves upon movement of the piston within the housing in said opposite axial directions.

13. A swaging tool for swaging a fitting having a sleeve for receiving a tube, and a swaging ring such that axial movement of the ring over the sleeve causes the ring to apply a radial force to the sleeve to thereby swage the sleeve to the tube, the swaging tool comprising:

(a) a housing having an inner surface and an outer surface;

(b) a piston movable in opposite axial directions within the housing, said piston having an outer surface in axial sliding engagement with the inner surface of the housing which reacts the moments generated during swaging directly into the housing;

(c) a first engaging member on the outer surface of the housing which is adapted to engage the ring or the sleeve, and to restrain one of them from axial movement; and (d) a second engaging member comprising a pair of spaced-apart legs connected to and extending outwardly from the outer surface of the piston, said housing having a corresponding pair of spaced-apart axial slots through which said legs move upon movement of the piston within the housing in said opposite axial directions, said second engaging member further comprising a yoke connected to said legs which is adapted to engage the ring or the sleeve, and to move the other of them in an axial direction toward the first engaging member upon movement of the piston within the housing in said axial direction.

14. The swaging tool of claim 13, further comprising a cap connected to the housing which encloses the piston within the housing.

15. The swaging tool of claim 14, wherein load sharing tapered external threads on the housing engage internal threads on the cap to connect the cap to the housing, and wherein the pair of spaced apart axial slots extend through the external threads on the housing.

16. The swaging tool of claim 15, further comprising a support ring on the housing to support the housing in the area where the external threads on the housing engage the internal threads on the cap.

17. The swaging tool of claim 13, further comprising means for biasing the first engaging member from the second engaging member in a normally spaced apart relationship.

18. The swaging tool of claim 17, wherein the biasing means comprises a spring interposed between one end of the housing adjacent to the first engaging member and the piston adjacent to the second engaging member.

19. The swaging tool of claim 13, wherein the axial forces generated during the swaging operation are concentrated on an axis which is substantially parallel to the axis of said housing.

20. The swaging tool of claim 19, wherein the generation of forces about an axis that is substantially parallel to the axis of the housing is provided by configuring the first engaging member and the second engaging member such that they each extend outwardly with respect to the outer surface of the housing by substantially the same distance, and such that their areas of engagement of the sleeve and the ring substantially coincide with the axis of the fitting.

21. In combination:

a swagable fitting comprising:

a sleeve for receiving a tube at each end thereof, wherein the sleeve has a tool engaging surface; and a swaging ring at each end of the sleeve such that axial movement of the rings over the sleeve causes the rings to apply radial forces to the sleeve to swage the sleeve to the tubes, wherein each swaging ring has a tool engaging surface with a configuration that substantially matches the configuration of the tool engaging surface of the sleeve; and a swaging tool comprising:

a housing having an inner surface and an outer surface;

a piston movable in opposite axial directions within the housing, said piston having an outer surface in axial sliding engagement with the inner surface of the housing;

a first engaging member on the outer surface of the housing that accepts both of the sleeve and one of the rings, and restrains one of them from axial movement; and a second engaging member on the piston that accepts both of the sleeve and one of the rings, and moves the other of them in an axial direction toward the first engaging member upon movement of the piston within the housing in said axial direction, such that one of said rings can be moved axially over the sleeve by the tool and thereafter the other of said rings can be moved axially over the sleeve by the tool without rotating the tool by 180 degrees.

* * * * *